United States Patent
Li et al.

(10) Patent No.: US 10,764,811 B2
(45) Date of Patent: Sep. 1, 2020

(54) METHOD FOR HANDOVER TO RELAY NODE, RELATED DEVICE, AND SYSTEM

(71) Applicant: Huawei Technologies Co., Ltd., Shenzhen (CN)

(72) Inventors: Guorong Li, Shenzhen (CN); Jian Wang, Beijing (CN); Da Wang, Shenzhen (CN); Nathan Edward Tenny, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 16/304,825

(22) PCT Filed: May 27, 2016

(86) PCT No.: PCT/CN2016/083698
§ 371 (c)(1),
(2) Date: Nov. 27, 2018

(87) PCT Pub. No.: WO2017/201741
PCT Pub. Date: Nov. 30, 2017

(65) Prior Publication Data
US 2019/0327661 A1    Oct. 24, 2019

(51) Int. Cl.
*H04W 40/22* (2009.01)
*H04W 76/10* (2018.01)

(52) U.S. Cl.
CPC .......... *H04W 40/22* (2013.01); *H04W 76/10* (2018.02)

(58) Field of Classification Search
CPC ..... H04W 40/00; H04W 40/02; H04W 40/04; H04W 40/22; H04W 40/34; H04W 40/36; H04W 76/10; H04W 76/12; H04W 76/15
See application file for complete search history.

(56) References Cited

U.S. PATENT DOCUMENTS

| 2010/0150103 A1 | 6/2010 | Womack et al. |
| 2011/0159802 A1 | 6/2011 | Binti Harum et al. |

(Continued)

FOREIGN PATENT DOCUMENTS

| CN | 102318431 A | 1/2012 |
| CN | 103999528 A | 8/2014 |

(Continued)

OTHER PUBLICATIONS

Foreign Communication From a Counterpart Application, European Application No. 16902731.5, Extended European Search Report dated Mar. 26, 2019, 7 pages.

(Continued)

*Primary Examiner* — Kevin D Mew
(74) *Attorney, Agent, or Firm* — Conley Rose, P.C.

(57) ABSTRACT

A method for handover to a relay node, a related device, and a system, where the method includes sending, by a base station of a target cell in an initial random access procedure initiated by a terminal device for the target cell, indication information to the terminal device using a random access message to instruct the terminal device to report information about a candidate relay device corresponding to the terminal device, receiving the information about the candidate relay device from the terminal device determining, in the candidate relay device according to the information about the candidate relay device, a target relay node used for relay communication between the terminal device and the base station, and handing over the terminal device to the target relay node.

20 Claims, 9 Drawing Sheets

(56) References Cited

U.S. PATENT DOCUMENTS

| | | | |
|---|---|---|---|
| 2013/0003586 A1* | 1/2013 | Tajima | H04W 74/08 370/252 |
| 2013/0051307 A1* | 2/2013 | Fan | H04W 76/10 370/315 |
| 2013/0083753 A1 | 4/2013 | Lee et al. | |
| 2014/0126460 A1* | 5/2014 | Bienas | H04W 74/002 370/315 |
| 2014/0307611 A1 | 10/2014 | Tesanovic et al. | |
| 2015/0358069 A1 | 12/2015 | Aboul-Magd et al. | |
| 2016/0100374 A1 | 4/2016 | Choi et al. | |
| 2016/0143059 A1 | 5/2016 | Jha et al. | |
| 2016/0345325 A1 | 11/2016 | Liu et al. | |
| 2017/0303282 A1* | 10/2017 | Lee | H04B 7/15542 |
| 2018/0152921 A1* | 5/2018 | Jung | H04L 5/14 |
| 2018/0152986 A1* | 5/2018 | Jung | H04W 76/27 |
| 2018/0176805 A1* | 6/2018 | Lee | H04W 92/18 |
| 2018/0227736 A1* | 8/2018 | Lee | H04W 36/08 |
| 2018/0317268 A1* | 11/2018 | Kim | H04W 40/22 |
| 2019/0082495 A1* | 3/2019 | Kim | H04W 76/27 |

FOREIGN PATENT DOCUMENTS

| | | |
|---|---|---|
| CN | 104040902 A | 9/2014 |
| CN | 104105103 A | 10/2014 |
| CN | 104812084 A | 7/2015 |
| CN | 105432107 A | 3/2016 |
| WO | 2015039676 A1 | 3/2015 |

OTHER PUBLICATIONS

Foreign Communication From a Counterpart Application, PCT Application No. PCT/CN2016/083698, English Translation of International Search Report dated Mar. 7, 2017, 2 pages.

Foreign Communication From a Counterpart Application, PCT Application No. PCT/CN2016/083698, English Translation of Written Opinion dated Mar. 7, 2017, 5 pages.

Fujitsu, "Consideration on the Enhancement of UE-to-Network Relay," R2-162240, 3GPP TSG-RAN WG2 Meeting#93bis, Dubrovnik, Croatia, Apr. 11-15, 2016, 3 pages.

* cited by examiner

METHOD FOR HANDOVER TO RELAY NODE, RELATED DEVICE, AND SYSTEM

CROSS-REFERENCE TO RELATED APPLICATIONS

This application is a U.S. National Stage of International Patent Application No. PCT/CN2016/083698 filed on May 27, 2016, which is hereby incorporated by reference in its entirety.

TECHNICAL FIELD

The present invention relates to the field of communications technologies, and in particular, to a method for handover to a relay node, a related device, and a system.

BACKGROUND

Today, wearable devices (Wearable Device, WD) have been widely used in such aspects as instant messaging, exercise recording, health care, and positioning, greatly facilitating people's life. A wearable device may directly communicate with a mobile communications network (Cellular network), and use a data transmission service provided by the mobile communications network to present rich application experience for a user.

However, an electricity storage capability of the wearable device is usually relatively weak, and a long-time connection to a mobile communications network (Cellular network) significantly consumes electricity of the wearable device, affecting a battery life. In particular, in a complex communication environment, the wearable device also needs to use higher transmit power to ensure stable and reliable communication, making it more difficult to achieve a long standby time.

SUMMARY

Embodiments of the present invention provide a method for handover to a relay node, a related device, and a system, to hand over a terminal device to a relay node as soon as possible, thereby reducing electricity consumption of the terminal device.

According to a first aspect, a method for handover to a relay node is provided. The method is applied to a base station side and includes:

in an initial random access procedure initiated by a terminal device for a target cell, sending, by a base station of the target cell, indication information to the terminal device by using a random access message, to instruct the terminal device to report information about a candidate relay device corresponding to the terminal device;

receiving the information about the candidate relay device reported by the terminal device;

determining, in the candidate relay device according to the information about the candidate relay device, a target relay node used for relay communication between the terminal device and the base station; and handing over the terminal device to the target relay node.

According to a second aspect, a method for handover to a relay node is provided. The method is applied to a terminal device side and includes:

in an initial random access procedure for a target cell, receiving, by a terminal device, indication information sent by a base station corresponding to the target cell by using a random access message, where the indication information is to instruct the terminal device to report information about a candidate relay device corresponding to the terminal device; and sending, by the terminal device, the information about the candidate relay device to the base station in response to the indication information, so that the base station determines a target relay node in the candidate relay device, and hands over the terminal device to the target relay node.

The first aspect and the second aspect describe the method for handover to a relay node according to the embodiments of the present invention respectively from the base station side and the terminal device side. Through implementation of the method, the terminal device can be handed over to a relay node as soon as possible, thereby reducing electricity consumption of the terminal device.

With reference to the first aspect or the second aspect, in some possible implementations, the indication information may be carried in at least one of the following messages: a random access response or a contention resolution message.

If the indication information is carried in the random access response or is carried in the random access response and the contention resolution message, the information about the candidate relay device may be carried in at least one of the following messages: a random access message 3, an RRC connection setup complete message, or an uplink message following the RRC connection setup complete message; or if the indication information is carried in the contention resolution message, the information about the candidate relay device may be carried in at least one of the following messages: an RRC connection setup complete message or an uplink message following the RRC connection setup complete message.

With reference to the first aspect or the second aspect, in some possible implementations, before sending the indication information to the terminal device by using the random access message, the base station needs to learn of a device type of the terminal device. The base station sends the indication information to the terminal device by using the random access message only under a condition of learning that the device type of the terminal device is a specified device type (for example, a wearable device).

Specifically, if the indication information is carried in at least one of the random access response or the contention resolution message, the terminal device may indicate the device type of the terminal device by using a random preamble. Correspondingly, the base station may learn of the device type of the terminal device by using the random preamble sent by the terminal device.

Specifically, if the indication information is carried in the contention resolution message, the terminal device may indicate the device type of the terminal device by using a message 3, where the message 3 carries information about the device type of the terminal device. Correspondingly, the base station may learn of the device type of the terminal device by using the message 3.

In some possible implementations, a method for indicating the device type of the terminal device by using the random access preamble may include: indicating the device type of the terminal device by using a PRACH resource carrying the random access preamble; or indicating the device type of the terminal device by using a preamble format of the random access preamble; or indicating the device type of the terminal device by using a group to which the random access preamble belongs.

With reference to the first aspect or the second aspect, in some possible implementations, the information about the candidate relay device may include at least one of the following: identification information of the candidate relay device corresponding to the terminal device and a measurement result of the candidate relay device corresponding to the terminal device; or identification information of a relay device that has a preset pairing relationship with the terminal device.

Specifically, the measurement result of the candidate relay device may include: a strength of signals between the candidate relay device and the terminal device, a load capability (for example, a data buffering capability or remaining electricity) of the candidate relay device, a current load amount of the candidate relay device, an information security processing (encryption and decryption) capability, and the like.

Specifically, the relay device that has a preset pairing relationship with the terminal device may be a device that has established a communication connection to the terminal device in advance. For example, the terminal device is a smart band of a user A, and the smart band is pre-bound with a mobile phone of the user A via Bluetooth. In this case, the preset pairing relationship exists between the mobile phone and the smart band.

In an actual application, considering security of user data, the base station may preferentially select a relay device that has a preset pairing relationship with the terminal device as the target relay node of the terminal device.

With reference to the first aspect or the second aspect, in some possible implementations, the terminal device may transmit the information about the candidate relay device carried in the message 3 in the following two manners:

In a first manner, one or more control elements (generated by a MAC layer) are added to the message 3, and the information about the candidate relay device carried in the message 3 is transmitted by using the added control elements, or the device type of the terminal device is indicated by using the added control elements.

In a second manner, the information about the candidate relay device or the information about the device type is added to an upper-layer message (for example, an RRC connection request) of the message 3.

With reference to the first aspect or the second aspect, in some possible implementations, the base station may add the indication information carried in a random access response (RAR) to a MAC RAR that is for the terminal device. The base station may alternatively add one or more control elements to the contention resolution message, and transmit, by using the added control elements, the indication information carried in the contention resolution message.

With reference to the first aspect or the second aspect, in some possible implementations, the terminal device may transmit the information about the candidate relay device carried in the RRC connection setup complete message in the following two manners:

In a first manner, one or more control elements are added to the RRC connection setup complete message, and the information about the candidate relay device carried in the RRC connection setup complete message is transmitted by using the added control elements.

In a second manner, the information about the candidate relay device is added to an upper-layer message of the RRC connection setup complete message.

According to a third aspect, a network device is provided. The network device includes units configured to perform the method according to the first aspect.

According to a fourth aspect, a terminal device is provided. The terminal device includes units configured to perform the method according to the second aspect.

According to a fifth aspect, a network device is provided. The network device includes: a memory and a processor, a transmitter, and a receiver that are coupled to the memory. The transmitter is configured to send data to the outside. The receiver is configured to receive data sent from the outside. The memory is configured to store code for implementing the method according to the first aspect. The processor is configured to execute the program code stored in the memory, that is, perform the method according to the first aspect.

According to a sixth aspect, a terminal device is provided. The terminal device includes: a memory and a processor, a transmitter, and a receiver that are coupled to the memory. The transmitter is configured to send data to the outside. The receiver is configured to receive data sent from the outside. The memory is configured to store code for implementing the method according to the second aspect. The processor is configured to execute the program code stored in the memory, that is, perform the method according to the second aspect.

According to a seventh aspect, a storage system is provided. The storage system includes a network device and a terminal device. The network device may be the network device described in the content of the third aspect. The terminal device may be the terminal device described in the content of the fourth aspect. The network device may alternatively be the network device described in the content of the fifth aspect, and the terminal device may alternatively be the terminal device described in the content of the sixth aspect.

According to an eighth aspect, a storage medium configured to store code for implementing the method according to the first aspect is provided.

According to a ninth aspect, a storage medium configured to store code for implementing the method according to the second aspect is provided.

Through implementation of the embodiments of the present invention, in the initial random access procedure initiated by the terminal device for the target cell, the base station of the target cell sends the indication information to the terminal device by using the random access message, to instruct the terminal device to report the information about the candidate relay device corresponding to the terminal device. In addition, the base station determines the target relay node in the candidate relay device, and finally hands over the terminal device to the target relay node. In this way, the terminal device (for example, a wearable device) can be handed over to the relay node as soon as possible, thereby reducing electricity consumption of the terminal device.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Terms used in the Description of Embodiments of the present invention are merely used to explain specific embodiments of the present invention, but are not intended to limit the present invention.

To facilitate understanding of the embodiments of the present invention, a relay (Relay) technology in the embodiments of the present invention is first described.

Figure 1:
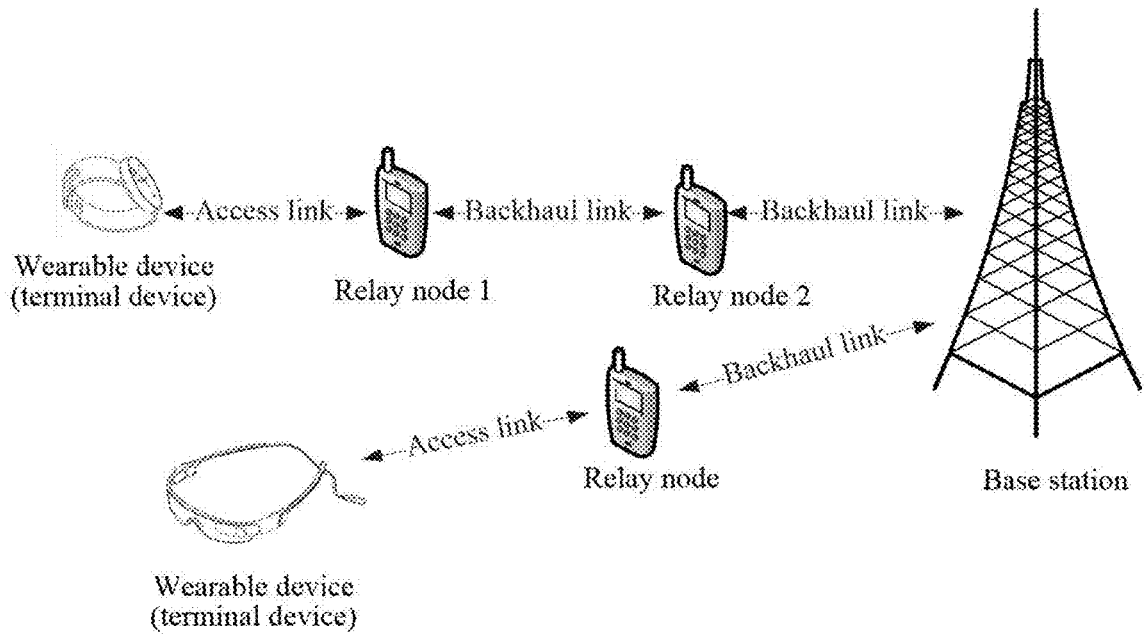
FIG. 1 is a schematic diagram of a relay communications system according to an embodiment of the present invention.

Referring to FIG. 1, FIG. 1 is a schematic diagram of a relay communications system in an embodiment of the present invention. As shown in FIG. 1, the relay technology is to add, between a base station and a terminal device, one or more relay nodes responsible for forwarding a wireless signal once or multiple times, that is, the wireless signal can reach the terminal device only after a plurality of hops. Using a simple two-hop relay as an example, a "base station—terminal" link is divided into two links: "base station—relay node" and "relay node—terminal", so that a poor-quality link can be replaced with two high-quality links, to achieve a higher link capacity and better coverage. Meanwhile, for the terminal device, communication between the terminal device and the relay node is device-to-device (Device to Device, D2D) communication, and data transmission between the terminal device and the relay node consumes low power. That is, the terminal device communicates with the base station by using the relay node as a relay, thereby reducing transmit power during data transmission.

It should be understood that the foregoing terminal device may be a handheld device, a computing device, or the like that has a wireless mobile communication function, for example, a mobile phone, an in-vehicle device, a wearable device, and a terminal device in a future 5G network.

For example, as shown in FIG. 1, the terminal device is a wearable device. To reduce electricity consumption of the wearable device, when there is a connectable relay device around the wearable device, the base station may hand over a communications link of the wearable device to the connectable relay device, and communicate with the wearable device by using the relay device as a relay.

Figure 2:
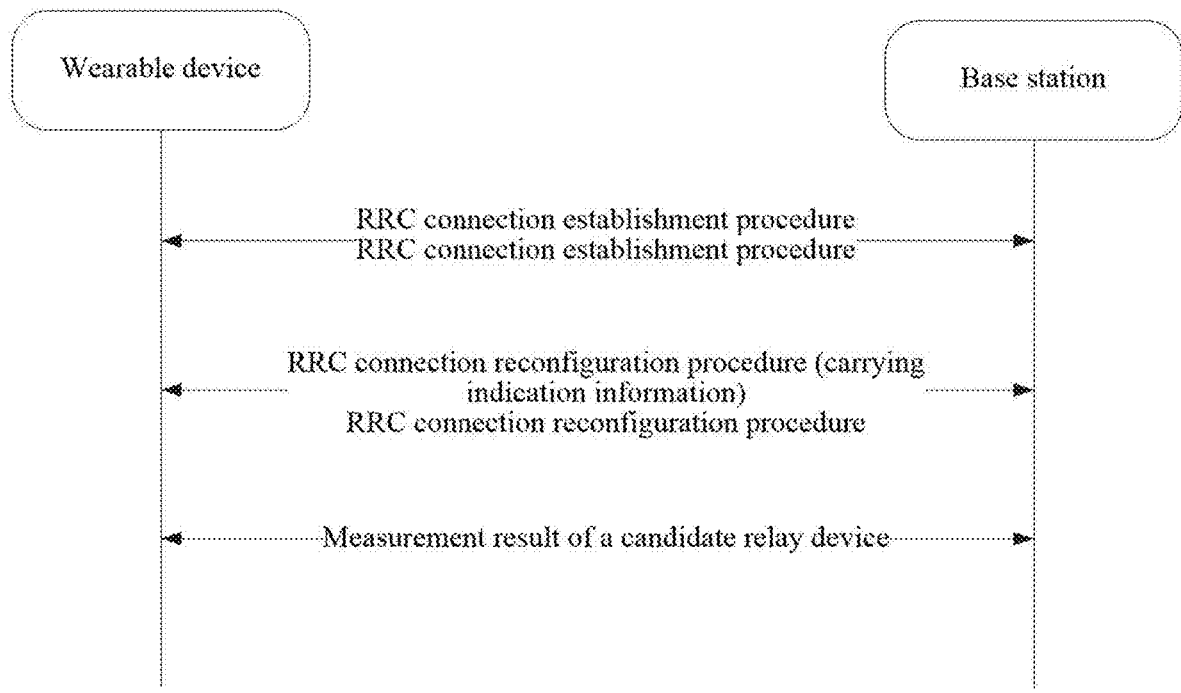
FIG. 2 is a schematic flowchart of reporting information about a candidate relay device by a wearable device in the prior art.

FIG. 2 shows a method for reporting information about a candidate relay device by a wearable device in the prior art. After a Radio Resource Control (Radio Resource Control, RRC) connection is established between a wearable device and a base station, the base station may instruct, by using an RRC connection reconfiguration (Reconfiguration) message, the wearable device to report a measurement result of a candidate relay device. Then, the wearable device sends the measurement result of the candidate relay device to the base station in response to the instruction, so that the base station selects one relay device from the candidate relay device for the wearable device based on the measurement result, and hands over a communications link of the wearable device to the relay device.

However, in a possible application scenario, data transmission needs to be performed between the base station and the wearable device by using the newly established RRC connection. In this case, because the wearable device has not been handed over to the relay device, a large amount of electricity needs to be consumed for data transmission.

In view of the technical problem in the prior art, the embodiments of the present invention provide a method for handover to a relay node, a related device, and a system, to hand over a terminal device (for example, a wearable device) to a relay node as soon as possible, thereby reducing electricity consumption of the terminal device. Details are respectively described in the following.

Figure 3:
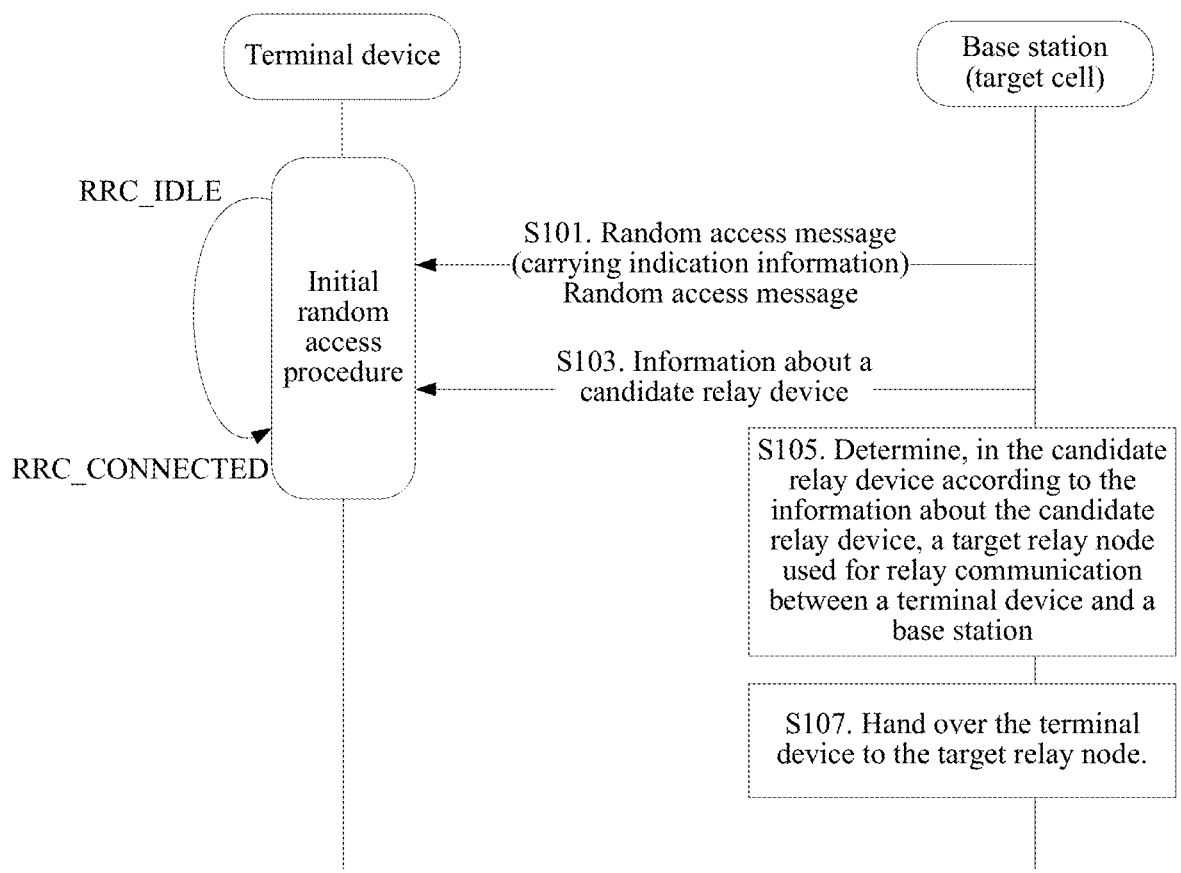
FIG. 3 is a schematic flowchart of a method for handover to a relay node according to an embodiment of the present invention.

Referring to FIG. 3, FIG. 3 is a schematic flowchart of a method for handover to a relay node according to an embodiment of the present invention. As shown in FIG. 3, the method includes the following steps.

S101. In an initial random access procedure initiated by a terminal device for a target cell, a base station of the target cell sends indication information to the terminal device by using a random access message, to instruct the terminal device to report information about a candidate relay device corresponding to the terminal device.

It should be understood that, before the initial random access, the terminal device is in an RRC idle state (RRC_IDLE). After the initial random access procedure, the terminal device may change from the RRC idle state (RRC_IDLE) to an RRC connected state (RRC_CONNECTED).

S103. Correspondingly, in the initial random access procedure for the target cell, the terminal device receives the indication information sent by the base station. In addition, the terminal device sends the information about the candidate relay device to the base station in response to the indication information.

In this embodiment of the present invention, the candidate relay device may be a device that has a device-to-device (Device to Device, D2D) communication connection to the terminal device. The D2D communication connection may be: a D2D communication connection based on Wi-Fi (Wireless Fidelity, wireless fidelity), Bluetooth (Bluetooth), ZigBee, Long Term Evolution (Long Term Evolution, LTE), or the like. The terminal device may correspond to two (or more) candidate relay devices, or may correspond to only one candidate relay device. No limitation is imposed herein.

In this embodiment of the present invention, the information about the candidate relay device may include at least one of the following: identification information of the candidate relay device corresponding to the terminal device and a measurement result of the candidate relay device corresponding to the terminal device; or identification information of a relay device that has a preset pairing relationship with the terminal device.

In some possible implementations, the measurement result of the candidate relay device may include: a strength of signals between the candidate relay device and the terminal device, a load capability (for example, a data buffering capability or remaining electricity) of the candidate relay device, a current load amount of the candidate relay device, an information security processing (encryption and decryption) capability, and the like. In an actual application, the base station may select an optimal or a comparatively good relay device for the terminal device based on the measurement result, and use the selected relay device as a target relay node of the terminal device.

In some possible implementations, the relay device that has a preset pairing relationship with the terminal device may be a device that has established a communication connection to the terminal device in advance. For example, the terminal device is a smart band of a user A, and the smart band is pre-bound with a mobile phone of the user A via Bluetooth. In this case, the preset pairing relationship exists between the mobile phone and the smart band. In an actual application, considering security of user data, the base station may preferentially select a relay device that has a preset pairing relationship with the terminal device as the target relay node of the terminal device.

In this embodiment of the present invention, the identification information of the relay device may be a radio network temporary identity (Radio Network Temporary Identity, RNTI) of the relay device, or may be a MAC address of the relay device, or may be other identification information that can be used by the base station to identify the relay device. No limitation is imposed herein.

S105. Correspondingly, the base station receives the information about the candidate relay device sent by the terminal device. In addition, the base station determines, in the candidate relay device according to the information about the candidate relay device, a target relay node used for relay communication between the terminal device and the base station.

S107. The base station hands over the terminal device to the target relay node.

It should be understood that the initial random access procedure is a contention-based random access procedure, and random access messages used in the initial random access procedure include:

Random access preamble (preamble), or referred to as a message 1 (Msg1 for short). The random access preamble is sent by the terminal device to the base station, and is used to request uplink synchronization.

Random access response (Random Access Response, RAR), or referred to as a message 2 (Msg2 for short). The RAR is a response of the base station to the random access preamble.

Message 3. The message 3 is sent by the terminal device to the base station. In the initial random access procedure, the message 3 includes an RRC connection setup request (RRC Connection Request).

Contention resolution message (Contention Resolution), or referred to as a message 4 (Msg4 for short). The contention resolution message is sent by the base station to the terminal device. If the terminal device receives a contention resolution related to a user identifier of the terminal device, it is considered that the terminal device successfully performs random access, the terminal device changes from an RRC idle state to an RRC connected state, and the random access procedure is complete.

RRC connection setup complete message (RRC connection setup complete), or referred to as a message 5 (Msg5 for short). The RRC connection setup complete message is sent by the terminal device to the base station. In this way, an RRC connection setup procedure is complete.

Figure 4A:
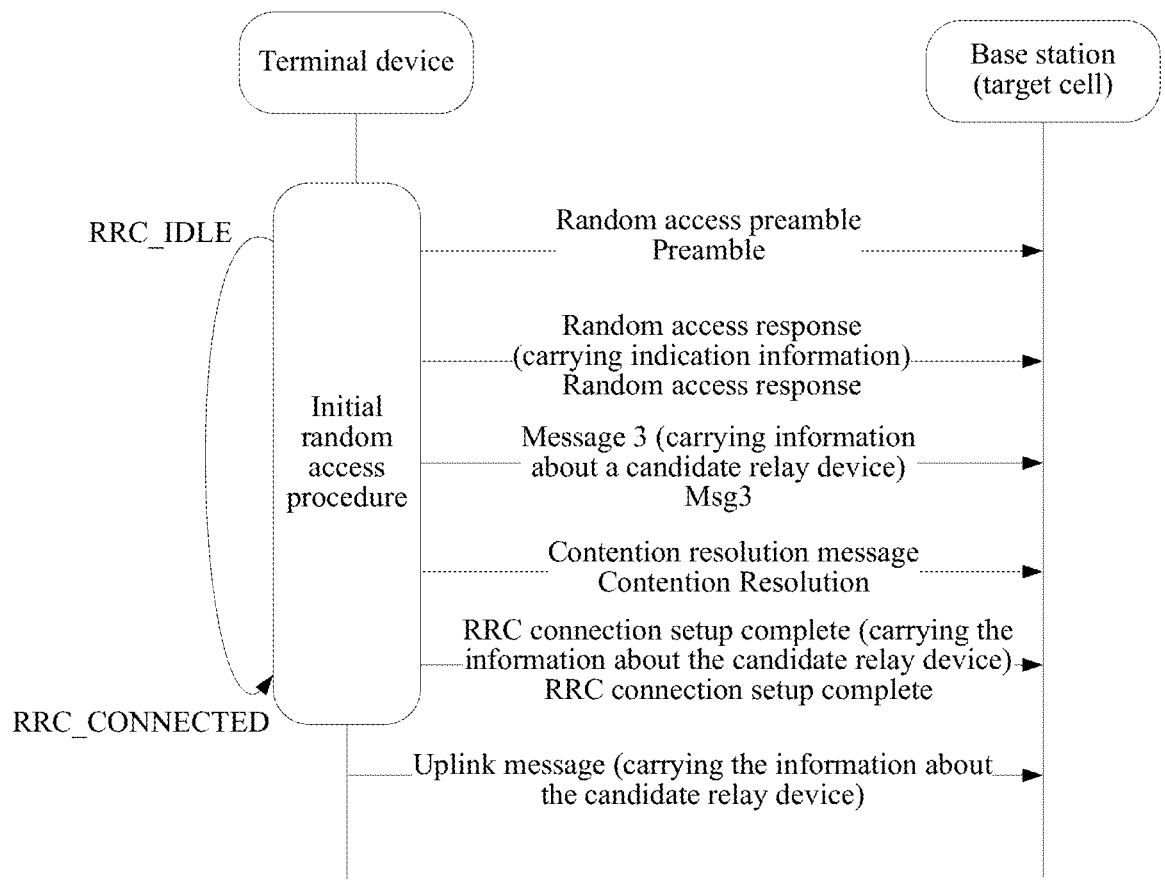
FIG. 4A and FIG. 4B are schematic flowcharts of several main manners of reporting information about a candidate relay device by a terminal device according to an embodiment of the present invention.
Figure 4B:
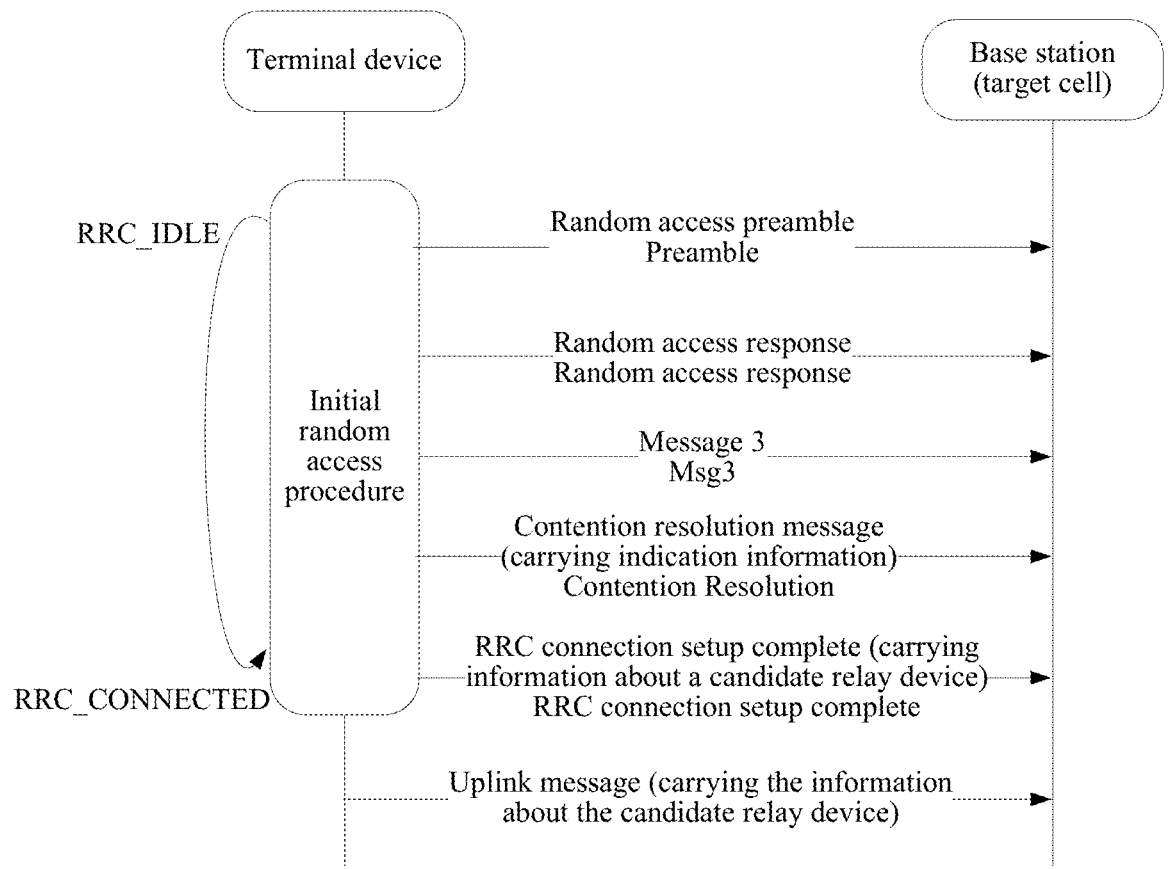

In this embodiment of the present invention, provided that the terminal device can report the information about the candidate relay device to the base station as soon as possible, the base station can hand over the terminal device (for example, a wearable device) to a relay node as soon as possible, thereby reducing electricity consumption of the terminal device. With reference to FIG. 4A and FIG. 4B, the following describes several main implementations of reporting the information about the candidate relay device by the terminal device according to an embodiment of the present invention.

As shown in FIG. 4A, the indication information sent by the base station to the terminal device may be carried in a random access response (Random Access Response, RAR) (that is, a message 2). That is, the base station may instruct, by using the first downlink random access message in the initial random access procedure, the terminal device to report the information about the candidate relay device. After receiving the indication information carried in the random access response, the terminal device may add the information about the candidate relay device to at least one of the following uplink messages: a message 3, an RRC connection setup complete message (that is, a message 5), or an uplink message following the RRC connection setup complete message.

Specifically, when the implementation shown in FIG. 4A is used, the terminal device may select, based on an actual requirement, which one or more of the uplink messages to carry the information about the candidate relay device.

In an actual application, because the message 3 is the first uplink random access message following the RAR, reporting the information about the candidate relay device by using the message 3 may enable the base station to hand over the terminal device to a relay device as soon as possible.

In an actual application, if a data amount of the information about the candidate relay device is large, the information about the candidate relay device may be transmitted in the message 5 with a relatively large quantity of reserved data bits (compared with the message 3).

In an actual application, to compensate for a possible loss of the information about the candidate relay device, the terminal device may send the information about the candidate relay device to the base station by using two or more of a message 3, an RRC connection setup complete message (that is, a message 5), or an uplink message following the RRC connection setup complete message. That is, the terminal device may repeatedly send the information about the candidate relay device to ensure that the base station can successfully receive the information about the candidate relay device, and finally successfully perform a relay handover.

It should be noted that in the implementation shown in FIG. 4A, in addition to adding the indication information to the random access response, the base station may further repeatedly transmit the indication information in a contention resolution message. That is, the indication information may also be carried in the random access response and the contention resolution message, to compensate for a possible loss of the indication information.

Further, before sending the indication information to the terminal device by using the random access response, the base station needs to learn of a device type of the terminal device. The base station sends the indication information to the terminal device by using the random access response only under a condition of learning that the device type of the terminal device is a specified device type (for example, a wearable device).

Herein, a device of the specified device type is a device that has a relatively low electricity storage capacity and that cannot support independent communication with the base station for a relatively long time. Such a device usually needs to maintain relatively long-time communication with the base station by using the candidate relay device (having a relatively high electricity storage capacity) as a relay. For example, the device of the specified device type may be specifically a wireless communications device having a relatively low electricity storage capacity (for example, lower than 1000 mAh) such as a wearable device, an M2M (Machine to Machine) device, or a mobile phone, or may be a wireless communications device whose standby time in a state of maintaining a communication connection to a base station is shorter than 50% of a standby time of a common smartphone. The examples are merely used to explain the embodiments of the present invention, and are not intended to constitute any limitation.

Figure 5A:
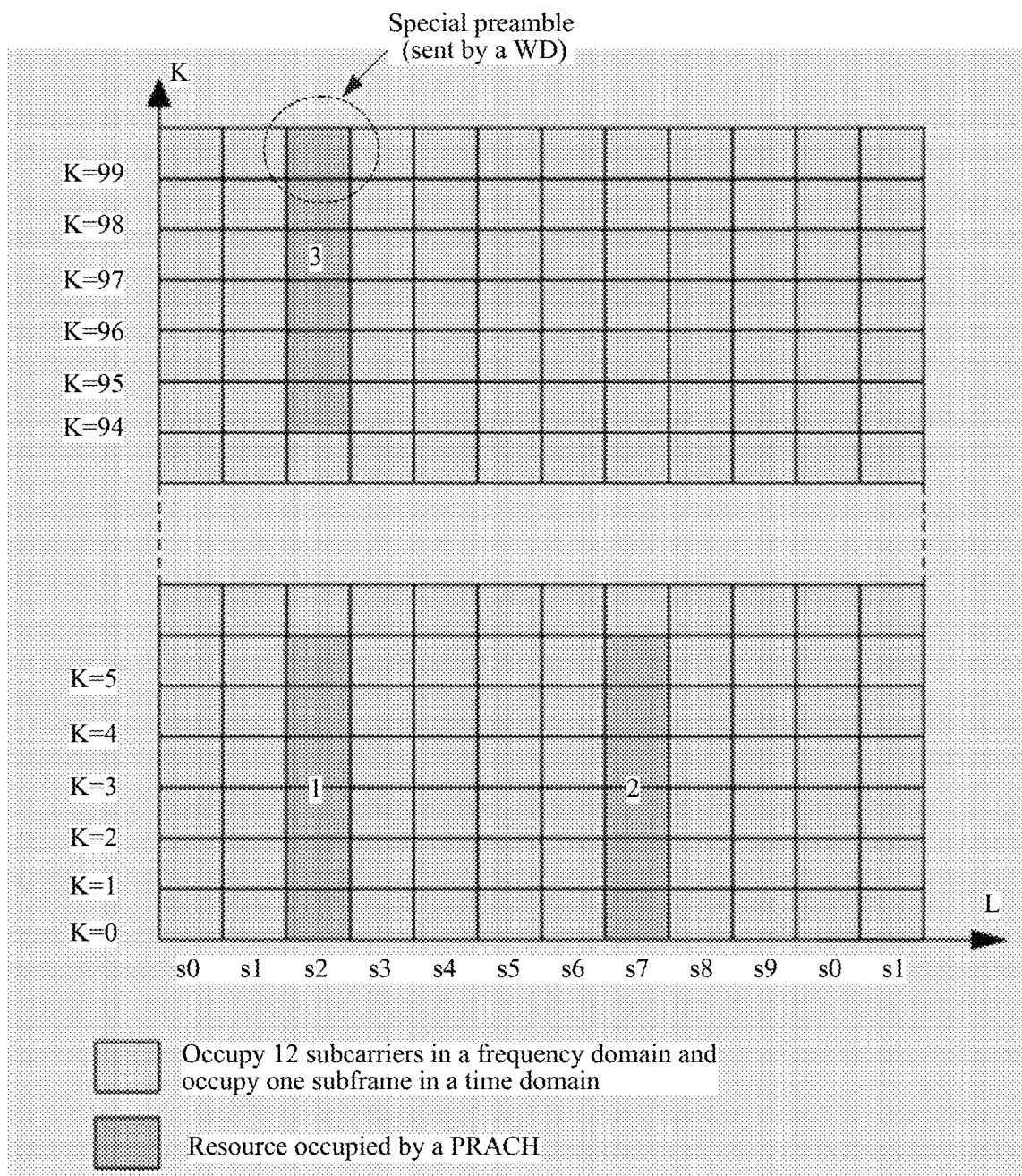
FIG. 5A to FIG. 5C are schematic diagrams of several manners of indicating a device type by using a random access preamble according to an embodiment of the present invention.

In the implementation shown in FIG. 4A, the terminal device may indicate the device type of the terminal device by using a random preamble. Specifically, the terminal device may indicate the device type of the terminal device in the following manners:

In a first implementation, the device type of the terminal device may be indicated by using a physical random access channel (Physical Random Access Channel, PRACH) resource carrying the random access preamble. FIG. 5A shows a PRACH resource (including "1", "2", and "3" in the accompanying drawings) carrying the random access preamble. In a specific implementation, an indication meaning of a preamble may be distinguished by distinguishing a resource carrying the preamble. For example, as shown in FIG. 5A, a random access preamble carried on a PRACH resource circled by dashed lines is a special preamble, indicating that a terminal device that sends the random access preamble is a device of the specified type (for example, a wearable device). The example is merely used to explain the embodiments of the present invention, and is not intended to constitute any limitation.

It should be understood that correspondingly, the base station may learn of the device type of the terminal device by using the PRACH resource carrying the random access preamble.

Figure 5B:
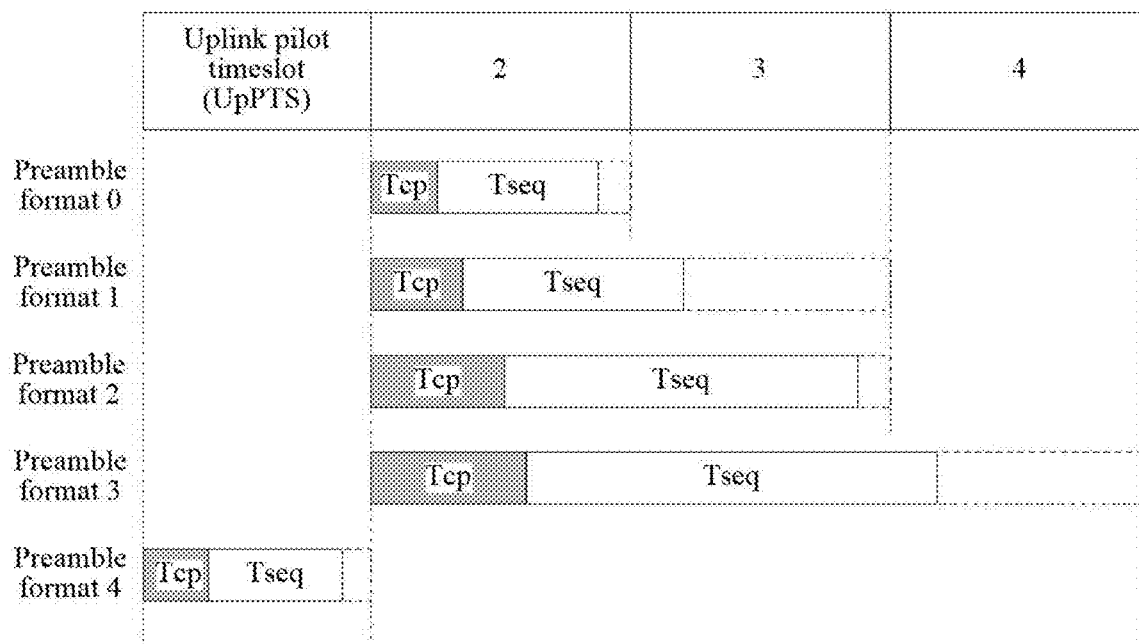

In a second implementation, the device type of the terminal device may be indicated by using a format of the random access preamble. As shown in FIG. 5B, the random access preamble has five formats. A preamble format 0 occupies one subframe, a preamble format 1 and a preamble format 2 occupy two subframes, and a preamble format 3 occupies three subframes. Particularly, a preamble format 4 can be used only in an uplink pilot timeslot (Uplink Pilot Time Slot, UpPTS). In a specific implementation, an indication meaning of the random access preamble may be distinguished by distinguishing the preamble format of the random access preamble. For example, a random access preamble in the preamble format 0 is a special preamble, indicating that a terminal device that sends the random access preamble is a device of the specified type (for example, a wearable device). The example is merely used to explain the embodiments of the present invention, and is not intended to constitute any limitation.

It should be understood that correspondingly, the base station may learn of the device type of the terminal device by using the format of the random access preamble.

Figure 5C:
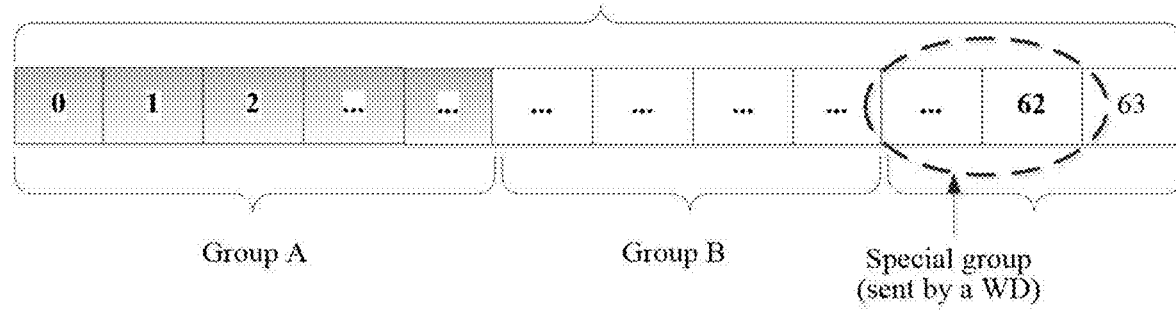

In a third implementation, the device type of the terminal device may be indicated by using a group to which the random access preamble belongs. As shown in FIG. 5C, there are 64 available preambles in a cell. Currently, these preambles are already grouped into two groups: a group A (group A) and a group B (group B). In a specific implementation, an indication meaning of the random access preamble may be distinguished by distinguishing the group to which the random access preamble belongs. For example, as shown in FIG. 5C, random access preambles circled by dashed lines are grouped into a special preamble group, indicating that a terminal device that sends the random access preamble in the special group is a device of the specified type (for example, a wearable device). The example is merely used to explain the embodiments of the present invention, and is not intended to constitute any limitation.

It should be understood that correspondingly, the base station may obtain the device type of the terminal device by using the group to which the random access preamble belongs.

As shown in FIG. 4B, the indication information sent by the base station to the terminal device may be carried in a contention resolution message (Contention Resolution) (that is, a message 4). That is, the base station may instruct, by using the second downlink random access message in the initial random access procedure, the terminal device to report the information about the candidate relay device. After receiving the indication information carried in the contention resolution message, the terminal device may add the information about the candidate relay device to at least one of the following uplink messages: an RRC connection setup complete message (that is, a message 5) or an uplink message following the RRC connection setup complete message.

Specifically, when the implementation shown in FIG. 4B is used, the terminal device may select, based on an actual requirement, to add the information about the candidate relay device to one or two of the RRC connection setup complete message and the uplink message following the RRC connection setup complete message. For specific content, refer to the related content in the implementation of FIG. 4A, and details are not described herein again.

Further, before sending the indication information to the terminal device by using the contention resolution message, the base station needs to learn of the device type of the terminal device. The base station sends the indication information to the terminal device by using the contention resolution message only under a condition of learning that the device type of the terminal device is a specified device type (for example, a wearable device). For a related description of the specified device type, refer to the related content in the implementation of FIG. 4A, and details are not described herein again.

Similar to the implementation corresponding to FIG. 4A, in the implementation shown in FIG. 4B, the terminal device may indicate the device type of the terminal device by using a random preamble. For details about a specific implementation of indicating the device type of the terminal device by using a preamble, refer to the related content in the implementation of FIG. 4A, and the details are not described herein again.

In the implementation shown in FIG. 4B, the terminal device may alternatively indicate the device type of the terminal device by using a message 3. In other words, the information about the device type of the terminal device may be carried in the message 3. Correspondingly, the base station may learn of the device type of the terminal device by using the message 3.

It should be understood that the random access messages (that is, the message 1 to the message 5) used in the random access procedure are substantially all Media Access Control (Media Access Control, English: Media Access Control, MAC for short) protocol data units (MAC Protocol Data Unit, MAC PDU).

Figure 6A:
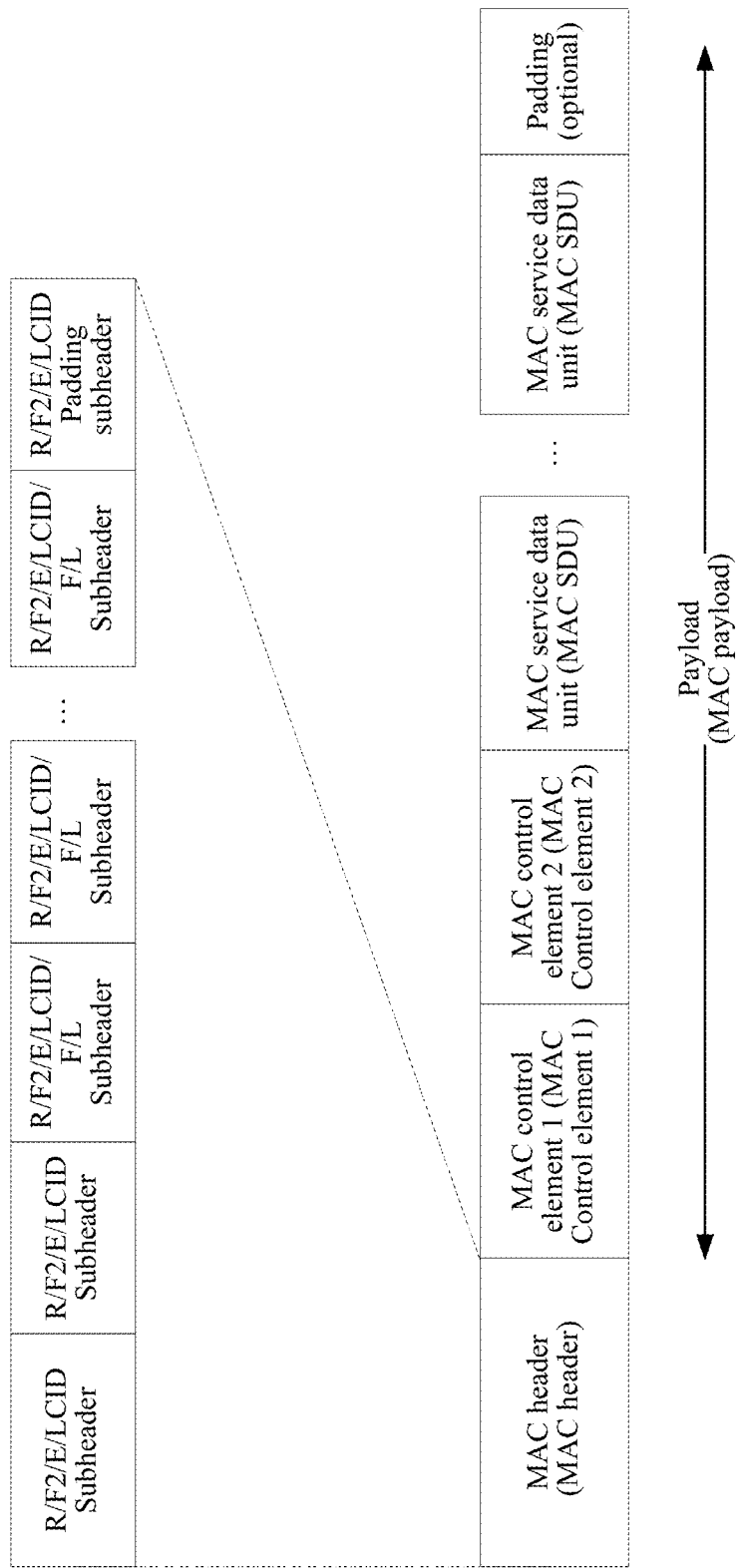
FIG. 6A is a schematic diagram of a data format of a MAC PDU according to an embodiment of the present invention.

FIG. 6A shows a MAC PDU (except a random access response RAR) of an uplink/downlink random access message. As shown in FIG. 6A, the MAC PDU includes: a MAC header (MAC header), zero or a plurality of service data units (Service Data Unit, SDU), zero or a plurality of control elements (Control element), and may have padding bits (padding). One MAC header may have one or more subheaders (subheader), and one subheader consists of six fields (R/R/E/LCID/F/L) or four fields (R/R/E/LCID).

In this embodiment of the present invention, a specific manner in which the message 3 carries the information about the candidate relay device may be as follows:

In a first possible implementation, the terminal device may add one or more control elements (generated by a MAC layer) to the message 3, and transmit, by using the added control elements, the information about the candidate relay device carried in the message 3, or indicate the device type of the terminal device by using the added control elements.

In another possible implementation, the terminal device may transmit, by using one or more SDUs (generated by an upper layer) in the message 3, the information about the candidate relay device carried in the message 3, or indicate the device type of the terminal device by using the one or more SDUs. Because the SDU is from the upper layer (for example, an RRC layer), the terminal device may add the information about the candidate relay device or the information about the device type to an upper-layer message (for example, an RRC Connection Request) of the message 3.

Similar to the manner in which the message 3 carries the information about the candidate relay device, the base station may add one or more control elements to the contention resolution message, and transmit, by using the added control elements, the indication information carried in the contention resolution message. The base station may alternatively add the indication information to an upper-layer message (for example, RRC Connection Setup) of the contention resolution message.

Similar to the manner in which the message 3 carries the information about the candidate relay device, the terminal device may add one or more control elements to the RRC connection setup complete message, and transmit, by using the added control elements, the information about the candidate relay device carried in the RRC connection setup complete message. The terminal device may alternatively add the information about the candidate relay device to an upper-layer message of the RRC connection setup complete message.

Figure 6B:
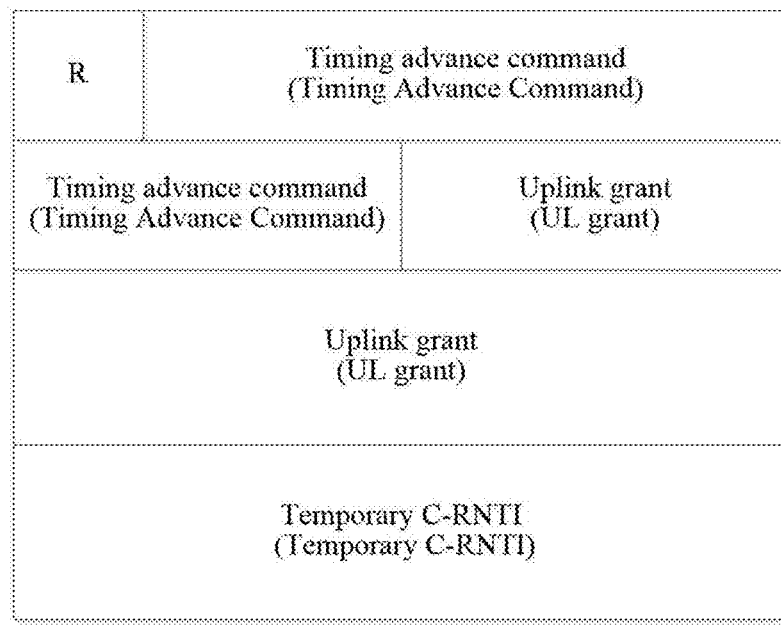
FIG. 6B is a schematic diagram of a data format of a MAC RAR according to an embodiment of the present invention.

FIG. 6B shows a MAC RAR (random access response). As shown in FIG. 6B, the MAC RAR includes the following several fields: a reserved bit R, a timing advance command field (Timing Advance Command), an uplink grant field (Uplink Grant, UL Grant for short), and a temporary C-RNTI field (Temporary C-RNTI) (C-RNTI: Cell Radio Network Temporary Identify, cell radio network temporary identifier).

In some possible implementations, the base station may add the indication information carried in a random access response (RAR) to a MAC RAR that is for the terminal device. Specifically, the base station may send the indication information by using the reserved bit R, to instruct the terminal device to report the information about the candidate relay device.

Through implementation of the method embodiment of FIG. 3, in the initial random access procedure initiated by the terminal device for the target cell, the base station of the target cell sends the indication information to the terminal device by using the random access message, to instruct the terminal device to report the information about the candidate relay device corresponding to the terminal device. In addition, the base station determines the target relay node in the candidate relay device, and finally hands over the terminal device to the target relay node. In this way, the terminal device (for example, a wearable device) can be handed over to the relay node as soon as possible, thereby reducing electricity consumption of the terminal device.

Figure 7:
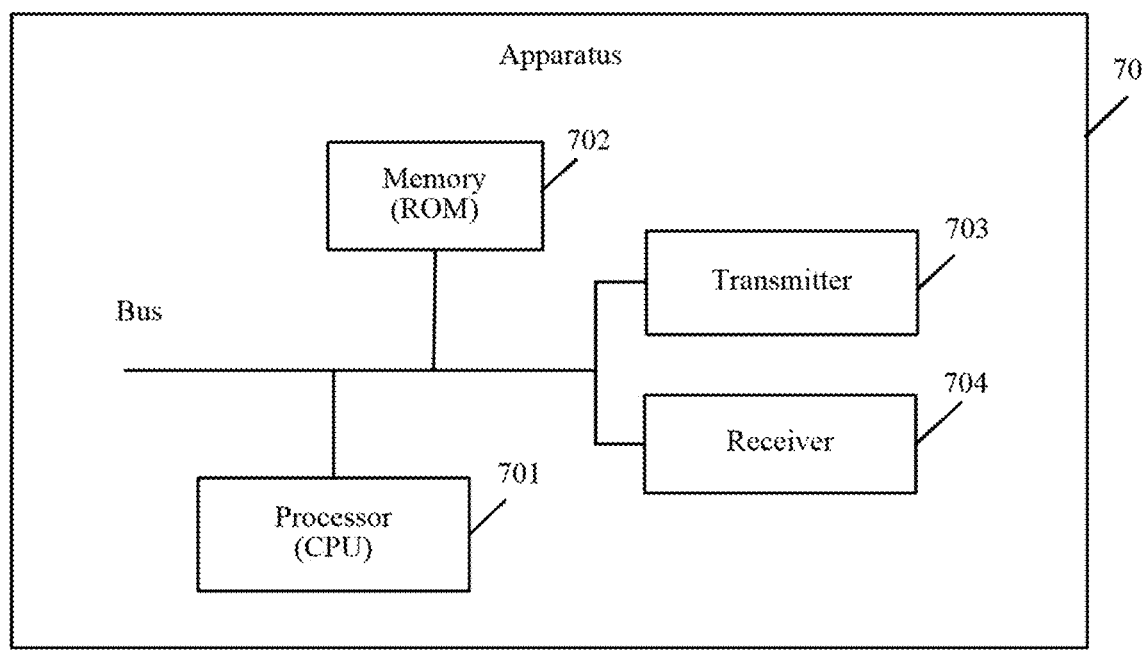
FIG. 7 is a schematic structural diagram of an apparatus according to an embodiment of the present invention.

Based on a same inventive concept, an embodiment of the present invention further provides an apparatus (as shown in FIG. 7), where the apparatus is configured to implement the method described in the foregoing embodiment of FIG. 3. As shown in FIG. 7, the apparatus 70 includes: a transmitter 703, a receiver 704, a memory 702, and a processor 701 coupled to the memory 702 (where there may be one or more processors 701, and one processor is used as an example in FIG. 7). The transmitter 703, the receiver 704, the memory 702, and the processor 701 may be connected by using a bus or in another manner (in FIG. 7, the connection by using a bus is used as an example). The transmitter 703 is configured to send data to the outside, and the receiver 704 is configured to receive data from the outside. The memory 702 is configured to store program code, and the processor 701 is configured to invoke and run the program code stored in the memory 702.

When the apparatus 70 is a network device, the program code stored in the memory 702 is specifically configured to implement the function of the base station in the embodiment of FIG. 3. Specifically, the processor 701 is configured to invoke the program code stored in the memory 702, and perform the following steps:

in an initial random access procedure initiated by a terminal device for a target cell, sending, by using the transmitter 703, indication information to the terminal device by using a random access message, to instruct the terminal device to report information about a candidate relay device corresponding to the terminal device;

receiving, by using the receiver 704, the information about the candidate relay device reported by the terminal device;

determining, in the candidate relay device according to the information about the candidate relay device received by the receiver 704, a target relay node used for relay communication between the terminal device and the base station; and handing over the terminal device to the target relay node.

In this embodiment of the present invention, the indication information may be carried in at least one of the following messages: a random access response or a contention resolution message.

Specifically, if the indication information is carried in the random access response or is carried in the random access response and the contention resolution message, the information about the candidate relay device may be carried in at least one of the following messages: a random access message 3, an RRC connection setup complete message, or an uplink message following the RRC connection setup complete message.

Specifically, if the indication information is carried in the contention resolution message, the information about the candidate relay device may be carried in at least one of the following messages: an RRC connection setup complete message or an uplink message following the RRC connection setup complete message.

For several main implementations of reporting the information about the candidate relay device by the terminal device according to the embodiments of the present invention, refer to the content in the embodiment of FIG. 3, and details are not described herein again.

Optionally, if the indication information is carried in at least one of the random access response or the contention resolution message, the processor 701 may be further configured to learn of a device type of the terminal device by using a random access preamble received by the receiver 704.

In a specific implementation, the processor 701 may be configured to: learn of the device type of the terminal device by using a PRACH resource carrying the random access preamble; or learn of the device type of the terminal device by using a format of the random access preamble; or learn of the device type of the terminal device by using a group to which the random access preamble belongs. For an implementation of learning of the type of the terminal device by using the random access preamble, specifically refer to the content in the embodiment of FIG. 3, and details are not described herein again.

Optionally, if the indication information is carried in the contention resolution message, the processor 701 is further configured to learn of the device type of the terminal device by using a message 3 received by the receiver 704, where the message 3 carries information about the device type of the terminal device.

It should be noted that when the apparatus 70 is a network device, refer to the related content of the base station in the method embodiment of FIG. 3 for steps performed by the processor 701 and other technical features related to the processor 701, and details are not described herein again.

When the apparatus 70 is a terminal device, the program code stored in the memory 702 is specifically configured to implement the function of the terminal device in the embodiment of FIG. 3. Specifically, the processor 701 is configured to invoke the program code stored in the memory 702, and perform the following steps:

in an initial random access procedure for a target cell, receiving, by using the receiver, indication information sent by a base station corresponding to the target cell by using a random access message, where the indication information is to instruct the terminal device to report information about a candidate relay device corresponding to the terminal device; and sending, by using the transmitter, the information about the candidate relay device to the base station in response to the indication information, so that the base station determines a target relay node in the candidate relay device, and hands over the terminal device to the target relay node.

In this embodiment of the present invention, the indication information may be carried in at least one of the following messages: a random access response or a contention resolution message.

Specifically, if the indication information is carried in the random access response or is carried in the random access response and the contention resolution message, the information about the candidate relay device may be carried in at least one of the following messages: a random access message 3, an RRC connection setup complete message, or an uplink message following the RRC connection setup complete message.

Specifically, if the indication information is carried in the contention resolution message, the information about the candidate relay device may be carried in at least one of the following messages: an RRC connection setup complete message or an uplink message following the RRC connection setup complete message.

For several main implementations of reporting the information about the candidate relay device by the terminal device according to the embodiments of the present invention, refer to the content in the embodiment of FIG. 3, and details are not described herein again.

Optionally, if the indication information is carried in at least one of the random access response or the contention resolution message, the processor 701 is further configured to indicate a device type of the terminal device by using a random access preamble sent by the transmitter.

Specifically, the processor 701 may be specifically configured to: indicate the device type of the terminal device by using a PRACH resource carrying the random access preamble; or indicate the device type of the terminal device by using a preamble format of the random access preamble; or indicate the device type of the terminal device by using a group to which the random access preamble belongs. For an implementation of indicating the type of the terminal device by using the random access preamble, specifically refer to the content in the embodiment of FIG. 3, and details are not described herein again.

Optionally, if the indication information is carried in the contention resolution message, the processor 701 is further configured to indicate the device type of the terminal device by using a message 3 sent by the transmitter, where the message 3 carries information about the device type of the terminal device.

It should be noted that when the apparatus 70 is a terminal device, refer to the related content of the terminal device in the method embodiment of FIG. 3 for steps performed by the processor 701 and other technical features related to the processor 701, and details are not described herein again.

Based on a same inventive concept, an embodiment of the present invention further provides a network device (shown in FIG. 8) and a terminal device (shown in FIG. 9), to perform the method for handover to a relay node described in the foregoing embodiment of FIG. 3.

Figure 8:
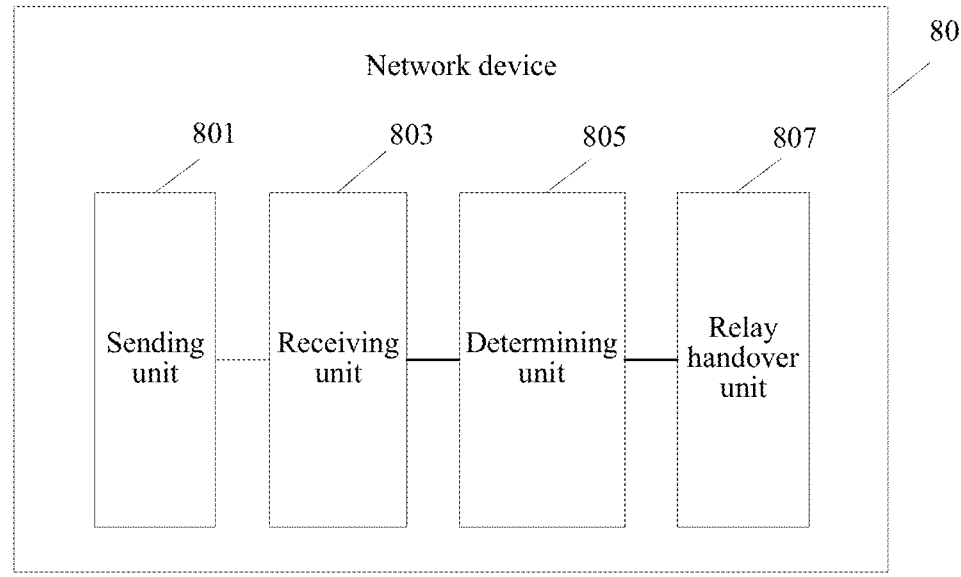
FIG. 8 is a schematic structural diagram of a network device according to an embodiment of the present invention.

As shown in FIG. 8, the network device 80 may include: a sending unit 801, a receiving unit 803, a determining unit 805, and a relay handover unit 807.

The sending unit 801 is configured to: in an initial random access procedure initiated by a terminal device for a target cell, send, by a base station of the target cell, indication information to the terminal device by using a random access message, to instruct the terminal device to report information about a candidate relay device corresponding to the terminal device.

The receiving unit 803 is configured to receive the information about the candidate relay device reported by the terminal device.

The determining unit 805 is configured to determine, in the candidate relay device according to the information about the candidate relay device, a target relay node used for relay communication between the terminal device and the base station.

The relay handover unit 807 is configured to hand over the terminal device to the target relay node.

It should be noted that, according to the detailed description of the foregoing embodiment of FIG. 3, a person skilled in the art can clearly learn of an implementation method of each functional module included in the network device 80. Therefore, for brevity of the specification, details are not described herein again.

Figure 9:
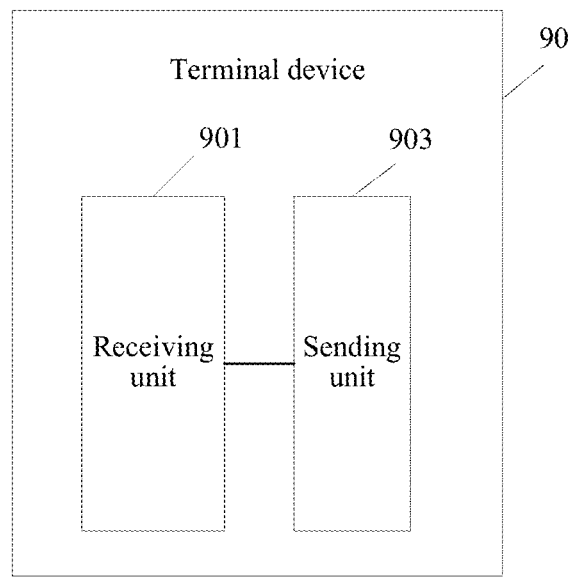
FIG. 9 is a schematic structural diagram of a terminal device according to an embodiment of the present invention.

As shown in FIG. 9, the terminal device 90 may include a receiving unit 901 and a sending unit 903.

The receiving unit 901 may be configured to: in an initial random access procedure for a target cell, receive indication information sent by a base station corresponding to the target cell by using a random access message, where the indication information is to instruct the terminal device to report information about a candidate relay device corresponding to the terminal device.

The sending unit 903 may be configured to send the information about the candidate relay device to the base station in response to the indication information, so that the base station determines a target relay node in the candidate relay device, and hands over the terminal device to the target relay node.

It should be noted that, according to the detailed description of the foregoing embodiment of FIG. 3, a person skilled in the art can clearly learn of an implementation method of each functional module included in the terminal device 90. Therefore, for brevity of the specification, details are not described herein again.

In addition, an embodiment of the present invention further provides a communications system, where the communications system includes a network device and a terminal device. The network device and the terminal device respectively correspond to the base station and the terminal device in the method embodiment of FIG. 3.

In a specific implementation, the network device may be a network device represented by the apparatus shown in FIG. 7, or may be a terminal device represented by the apparatus shown in FIG. 7. The network device may alternatively be the network device 80 shown in FIG. 8, and the terminal device may alternatively be the terminal device 90 shown in FIG. 9.

Through implementation of the embodiments of the present invention, in the initial random access procedure initiated by the terminal device for the target cell, the base station of the target cell sends the indication information to the terminal device by using the random access message, to instruct the terminal device to report the information about the candidate relay device corresponding to the terminal device. In addition, the base station determines the target relay node in the candidate relay device, and finally hands over the terminal device to the target relay node. In this way, the terminal device (for example, a wearable device) can be handed over to the relay node as soon as possible, thereby reducing electricity consumption of the terminal device.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a magnetic disk storage, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device, so that a series of operations and steps are performed on the computer or the another programmable device, thereby generating computer-implemented processing. Therefore, the instructions executed on the computer or any other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. In this case, the present invention is intended to cover these modifications and variations provided that they fall within the scope defined by the claims and their equivalent technologies of the present invention.

What is claimed is:

1. A network device, comprising:
a transmitter;
a receiver; and
a processor coupled to the transmitter and the receiver and configured to:
send, using the transmitter in an initial random access procedure initiated by a terminal device for a target cell, indication information to the terminal device using a first random access message to instruct the terminal device to report information about a candidate relay device corresponding to the terminal device;
receive, using the receiver, the information about the candidate relay device from the terminal device;
determine, in the candidate relay device according to the information about the candidate relay device, a target relay node used for relay communication between the terminal device and the network device; and
hand over the terminal device to the target relay node.

2. The network device of claim 1, wherein the indication information is carried in at least one of the following messages:
a random access response; or
a contention resolution message.

3. The network device of claim 2, wherein the information about the candidate relay device is carried in at least one of the following messages:
a random access message 3, a Radio Resource Control (RRC) connection setup complete message, or an uplink message following the RRC connection setup complete message when the indication information is carried in the random access response or is carried in the random access response and the contention resolution message; and the RRC connection setup complete message or the uplink message following the RRC connection setup complete message when the indication information is carried in the contention resolution message.

4. The network device of claim 2, wherein the indication information is carried in at least one of the random access response or the contention resolution message, and wherein the processor is further configured to:
receive, using the receiver, a random access preamble; and
identify a device type of the terminal device by using the random access preamble.

5. The network device of claim 4, wherein the processor is further configured to identify the device type of the terminal device using a Physical Random Access Channel (PRACH) resource carrying the random access preamble.

6. The network device of claim 2, wherein the indication information is carried in the contention resolution message, and wherein the processor is further configured to:
receive, using the receiver, a message 3; and
identify a device type of the terminal device using a message 3, wherein the message 3 carries information about the device type of the terminal device.

7. The network device of claim 4, wherein the processor is further configured to send, using the transmitter, the indication information to the terminal device using a second random access message under a condition that the device type of the terminal device is a specified device type.

8. The network device of claim 1, wherein the information about the candidate relay device comprises identification information of the candidate relay device corresponding to the terminal device and a measurement result of the candidate relay device corresponding to the terminal device.

9. A terminal device, comprising:
a transmitter;
a receiver; and
a processor coupled to the transmitter and the receiver and configured to:
receive, using the receiver in an initial random access procedure for a target cell, indication information from a base station corresponding to the target cell using a first random access message, wherein the indication information instructs the terminal device to report information about a candidate relay device corresponding to the terminal device; and
send, using the transmitter, the information about the candidate relay device to the base station in response to the indication information to enable the base station to determine a target relay node in the candidate relay device and to hand over the terminal device to the target relay node.

10. The terminal device of claim 9, wherein the indication information is carried in at least one of the following messages:
a random access response; or
a contention resolution message.

11. The terminal device of claim 10, wherein the information about the candidate relay device is carried in at least one of the following messages:
a random access message 3, a Radio Resource Control (RRC) connection setup complete message, or an uplink message following the RRC connection setup complete message when the indication information is carried in the random access response or is carried in the random access response and the contention resolution message; and
the RRC connection setup complete message or the uplink message following the RRC connection setup complete message when the indication information is carried in the contention resolution message.

12. The terminal device of claim 10, wherein the indication information is carried in at least one of the random access response or the contention resolution message, and wherein the processor is further configured to indicate a device type of the terminal device using a random access preamble sent using the transmitter.

13. The terminal device of claim 12, wherein the processor is further configured to:
indicate the device type of the terminal device using a Physical Random Access Channel (PRACH) resource carrying the random access preamble;
indicate the device type of the terminal device using a preamble format of the random access preamble; or
indicate the device type of the terminal device using a group to which the random access preamble belongs.

14. The terminal device of claim 10, wherein the indication information is carried in the contention resolution message, wherein the processor is further configured to indicate a device type of the terminal device using a message 3 sent using the transmitter, and wherein the message 3 carries information about the device type of the terminal device.

15. The terminal device of claim 12, wherein the indication information is received from the base station under a condition that the device type of the terminal device is a specified device type.

16. The terminal device of claim 9, wherein the information about the candidate relay device comprises identification information of the candidate relay device corresponding to the terminal device and a measurement result of the terminal device for the candidate relay device.

17. The network device of claim 4, wherein the processor is further configured to identify the device type of the terminal device using a format of the random access preamble.

18. The network device of claim 4, wherein the processor is further configured to identify the device type of the terminal device using a group to which the random access preamble belongs.

19. The network device of claim 1, wherein the information about the candidate relay device comprises identification information of a relay device having a preset pairing relationship with the terminal device.

20. The terminal device of claim 9, wherein the information about the candidate relay device comprises identification information of a relay device that has a preset pairing relationship with the terminal device.

* * * * *